J. WIEBE.
EGG DRIER.
APPLICATION FILED OCT. 18, 1910.

992,622.

Patented May 16, 1911.

WITNESSES:
H. A. Stok.
H. Schroeder

INVENTOR
John Wiebe
BY
E. E. Vrooman,
ATTORNEY.

UNITED STATES PATENT OFFICE.

JOHN WIEBE, OF PETALUMA, CALIFORNIA.

EGG-DRIER.

992,622.   Specification of Letters Patent.   Patented May 16, 1911.

Application filed October 18, 1910. Serial No. 587,663.

*To all whom it may concern:*

Be it known that I, JOHN WIEBE, a citizen of the United States, residing at Petaluma, in the county of Sonoma and State of California, have invented certain new and useful Improvements in Egg-Driers, of which the following is a specification.

This invention relates to apparatus for drying eggs and has for its object to provide a light portable and efficacious apparatus, for rapidly removing moisture from the shell of eggs after they have been washed.

The invention comprises in its general features a casing so constructed as to permit the passage of air through the same and containing an apertured support to hold a number of eggs and means for moving air over said eggs.

Figure 1:
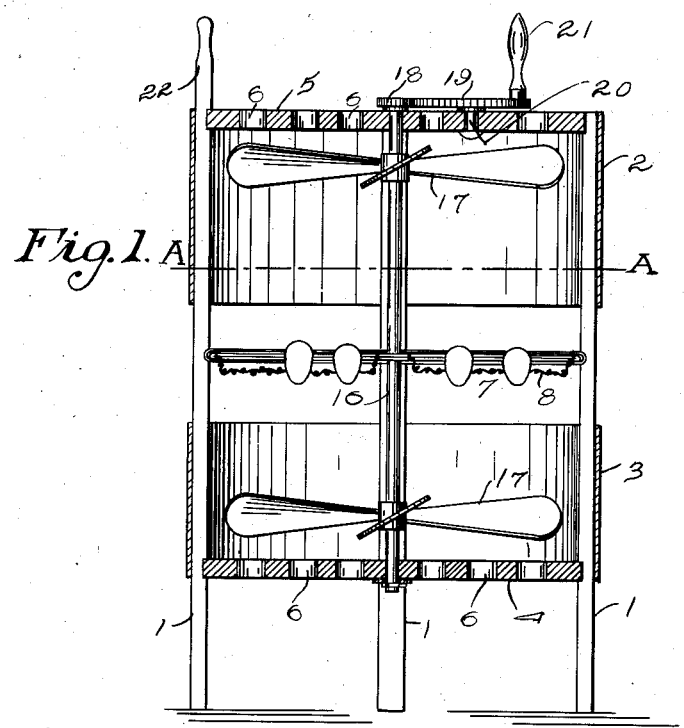
Figure 2:
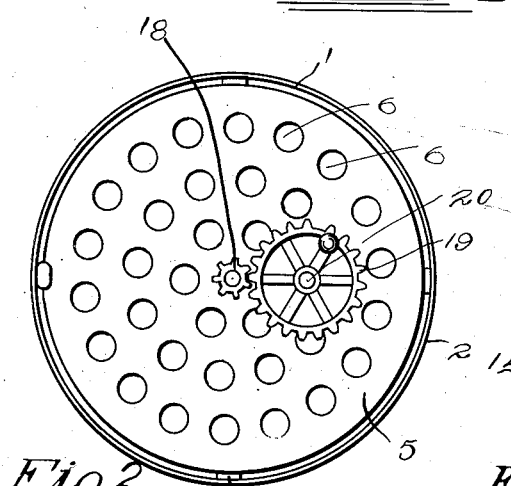
Figure 3:
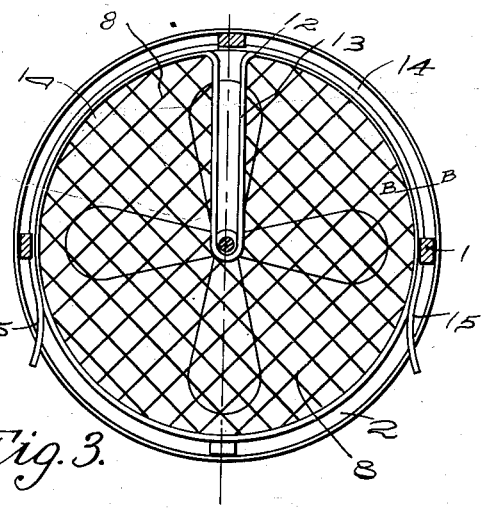
Figure 4:
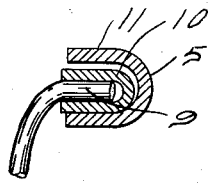

Referring to the accompanying drawings: Figure 1 is a view in vertical section of an apparatus constructed in accordance with this invention. Fig. 2 is a plan view thereof. Fig. 3 is a horizontal section on the line A—A of Fig. 1. Fig. 4 is an enlarged detail view partly in cross section of a portion of the egg tray.

In carrying out the invention a suitable casing is provided, and as here shown, preferably constructed with uprights 1, and an upper and lower cylindrical casing 2 and 3, spaced apart from each other, so as to permit the passage of air between the ends of the casing. The casing is formed with an apertured top and bottom, and as here shown, preferably consists of a bottom 4 and top 5 having apertures 6 for the passage of air, said bottom 4 being mounted on the uprights 1 at a little distance from their lower ends.

Approximately midway between the top and bottom of the casing is located an apertured tray, and as here shown, preferably consisting of a shallow basket 7 formed of reticulated material 8 being of such a depth as to prevent eggs resting in the openings in the reticulated material, as shown in Fig. 1 from being shaken out of place. About the periphery at the top of the basket, the wires in the reticulated material are formed with bent ends 9 which are clamped in an annular U-shaped strip 10 movably mounted in an annular U-shaped metallic strip 11 serving as a support which is secured in any suitable manner to the uprights 1. The tray is held in place by means of a metallic strip 12 formed with an extended U-shaped portion 13 and with curved members 14 terminating in spring ends 15 adapted to be sprung between the uprights 1 and the sides of the tray, the U-shaped portion 13 extending over the vertical shaft 16, having its upper and lower ends mounted in the top 5 and the bottom 4 of the casing, and adapted to revolve therein.

Mounted upon the shaft 16 and adjacent to each end thereof is a fan 17, the blades of said fan being pitched so as to drive air in the same direction. The shaft 16 is rotated by any suitable means, and as here shown by means of the pinion 18 meshing with the toothed wheel 19 mounted on a pivot pin 20 in the top 5 and provided with an operating handle 21. The ratio between the gears 18 and 19 is such that the fan shaft will be driven at high speed by a small number of turns of the handle 21.

One of the uprights 1 is provided with an extension 22 which serves as a handle for lifting the casing.

The apparatus is used as follows: Sorted eggs are washed and placed upon the tray which is then slid into place on the supporting hoop 11. By operating the gear mechanism a strong current of air is directed down against the eggs, which current of air is augmented by the suction of the lower fan. This action quickly dries the tops of the eggs and more slowly dries the bottoms thereof, and by reversing the rotation of the fans, the blast may be directed against the bottom of the eggs. By means of this apparatus, eggs may be dried very much quicker than by natural evaporation.

Having described my invention, what I claim is:

1. In an apparatus for drying eggs, a casing having a top and bottom each provided with apertures, an annular opening in said casing between its top and bottom, a basket of reticulated material detachably mounted in said casing, a rotary vertical shaft projecting through said casing, a rotary fan mounted on said shaft adjacent to each end thereof, and means for rotating said shaft in either direction.

2. An apparatus for drying eggs, consisting of uprights, a pair of annular casings mounted on said uprights and spaced apart from each other, the lower casing being elevated above the lower end of said uprights, a perforated bottom in said lower casing, a perforated top in said upper casing, a shallow reticulated basket detachably mounted in the uprights between said casings, a spring clip for detachably holding said basket in place, a vertical rotary shaft mounted in the bottom and top of said casing, a fan mounted on said shaft, adjacent to each end thereof, and a gear mechanism connected with said shaft for rotating it alternately in opposite directions.

In testimony whereof I affix my signature in presence of two witnesses.

JOHN WIEBE.

Witnesses:
H. C. SCHROEDER,
F. P. SCHROEDER.